United States Patent [19]

Small et al.

[11] 3,961,747
[45] June 8, 1976

[54] COMMODITY IDENTIFICATION APPARATUS

[75] Inventors: James R. Small; Robert C. Meckstroth, both of Dayton, Ohio

[73] Assignee: Hobart Corporation, Troy, Ohio

[22] Filed: Apr. 30, 1975

[21] Appl. No.: 573,594

[52] U.S. Cl. .............................. 235/61.9 R; 177/3; 177/4; 235/61.7 R; 235/61.11 E; 235/151.33
[51] Int. Cl.² ................. G06K 15/02; G01G 23/38; G01G 19/40; G06K 7/10
[58] Field of Search .................. 235/61.9 R, 61.7 R, 235/151.33; 177/4, 25, 3

[56] References Cited
UNITED STATES PATENTS

| | | |
|---|---|---|
| 3,650,773 | 3/1972 | Bush et al. .............................. 177/4 |
| 3,701,991 | 10/1972 | Livesey .................................. 177/4 |
| 3,789,193 | 1/1974 | Bremner ....................... 235/61.11 R |
| 3,825,085 | 7/1974 | Martin .................................... 177/3 |

Primary Examiner—Daryl W. Cook
Attorney, Agent, or Firm—Biebel, French & Nauman

[57] ABSTRACT

A commodity identification key carrying apertures arranged in rows and columns for organization of commodity identification, parity checking, and clock control information, provision for manually controlled reading of the commodity identification information into storage, provision for repeatedly reading the commodity information out of storage and repeatedly checking the parity thereof, and provision for controlling the printing of a machine readable bar code representative of a commodity identification.

15 Claims, 14 Drawing Figures

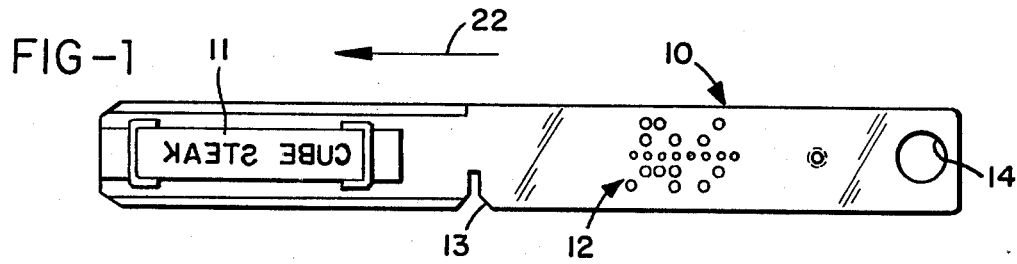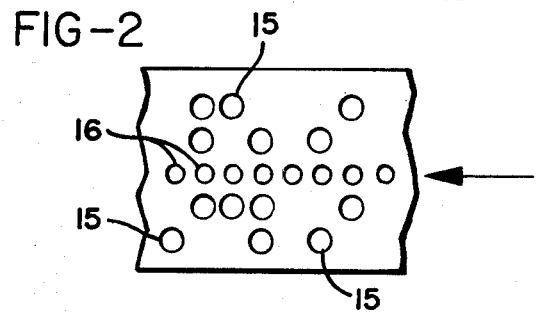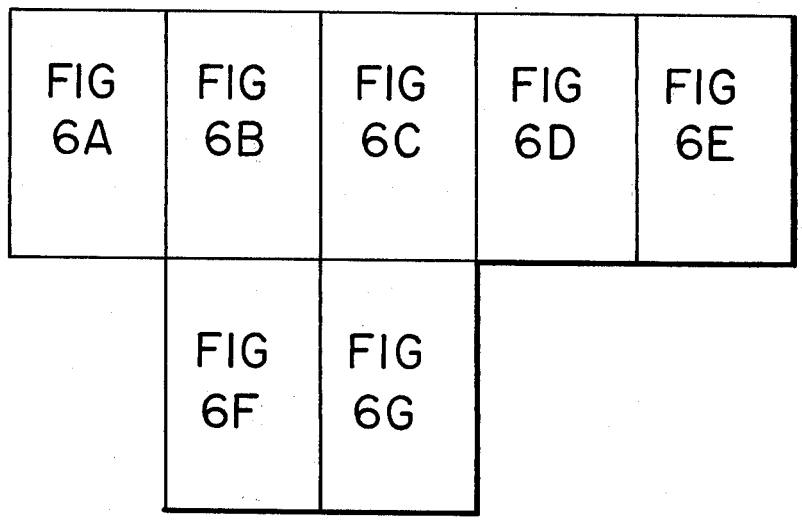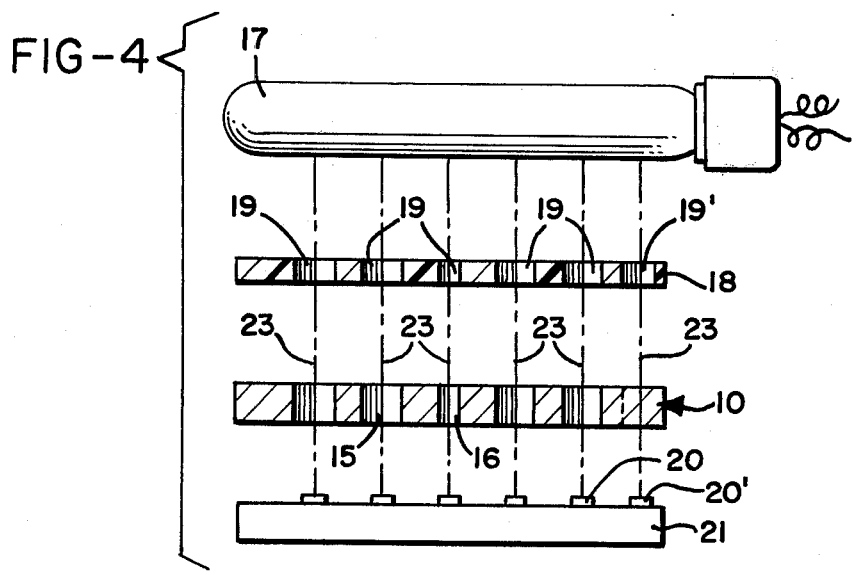

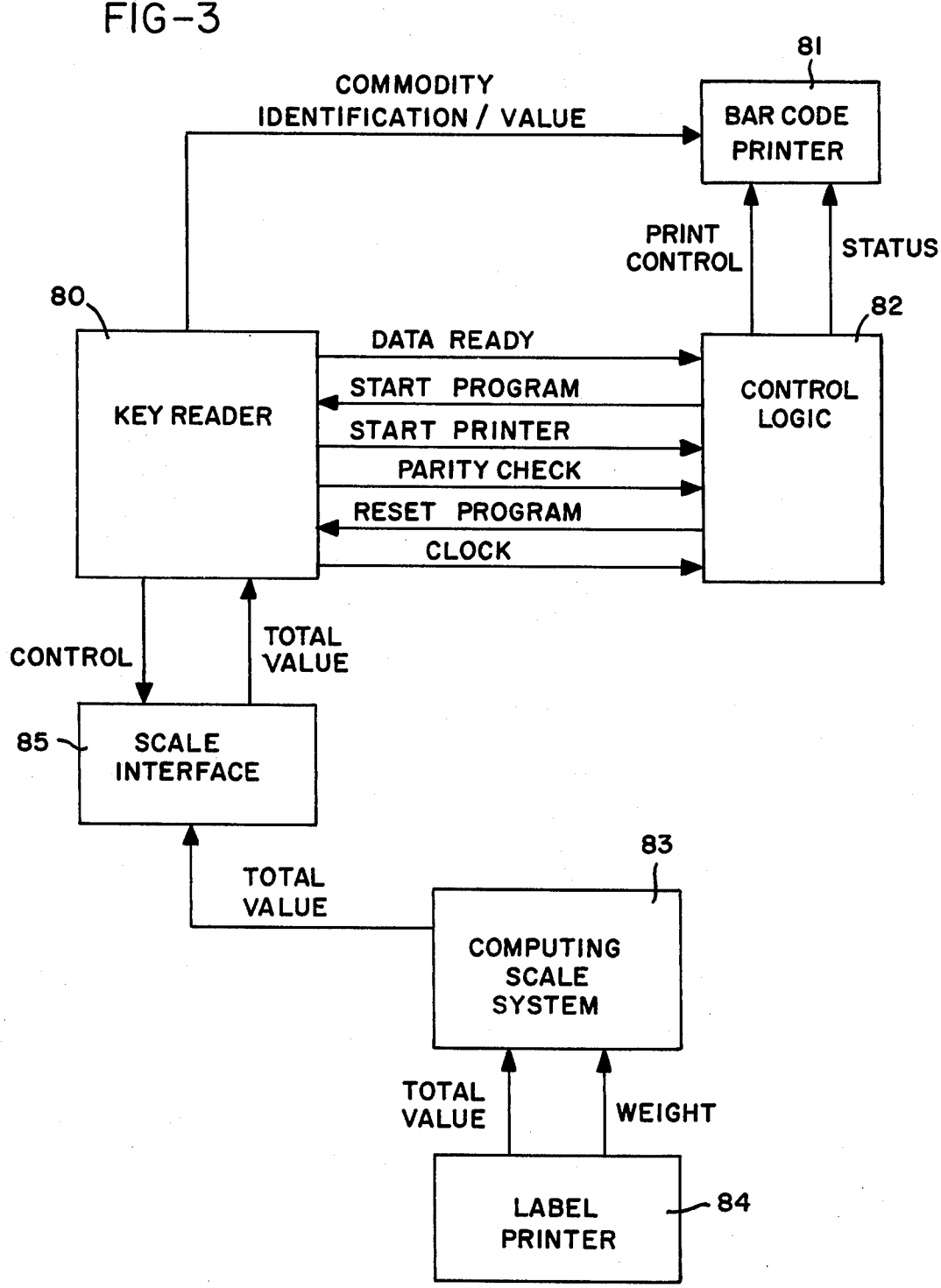

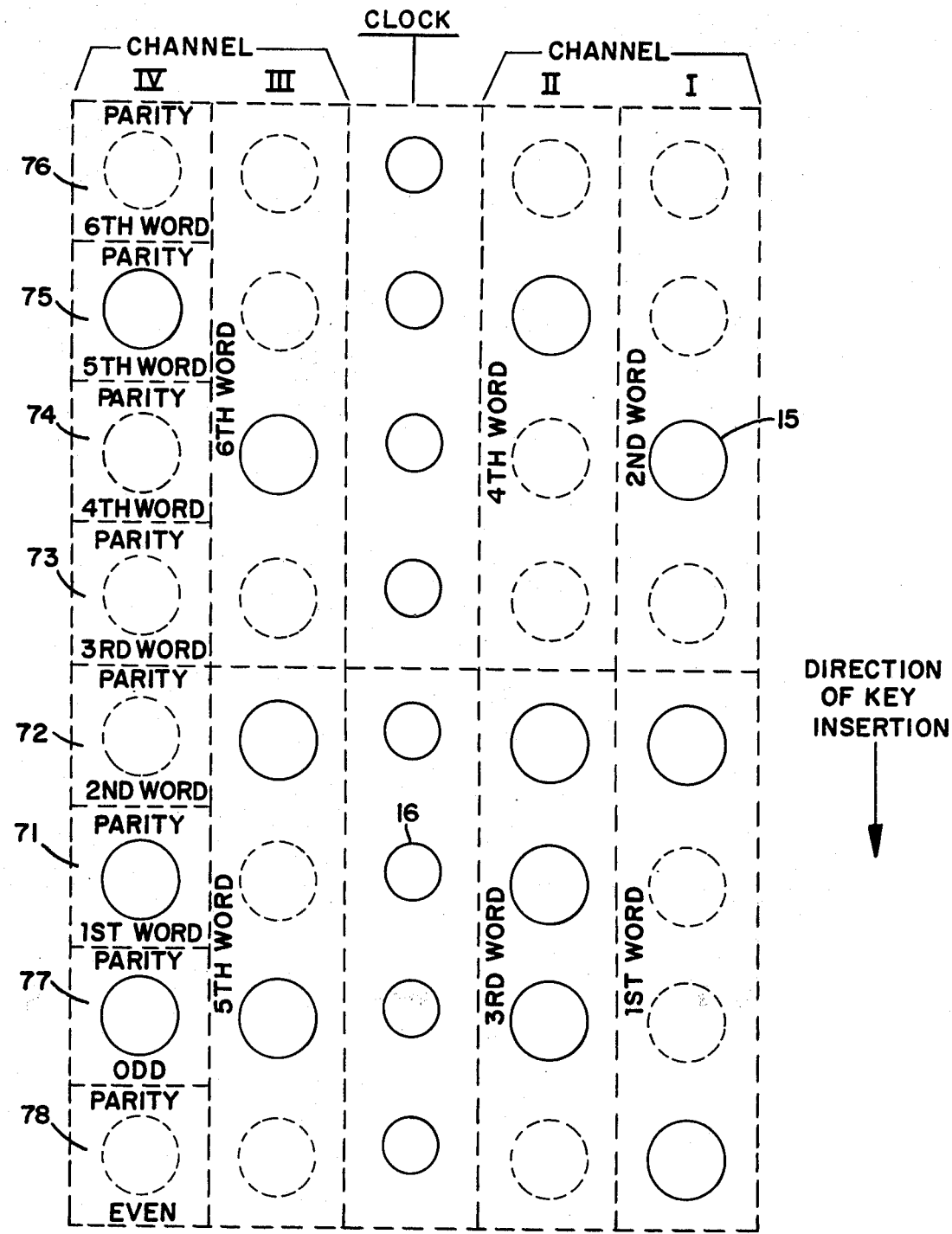

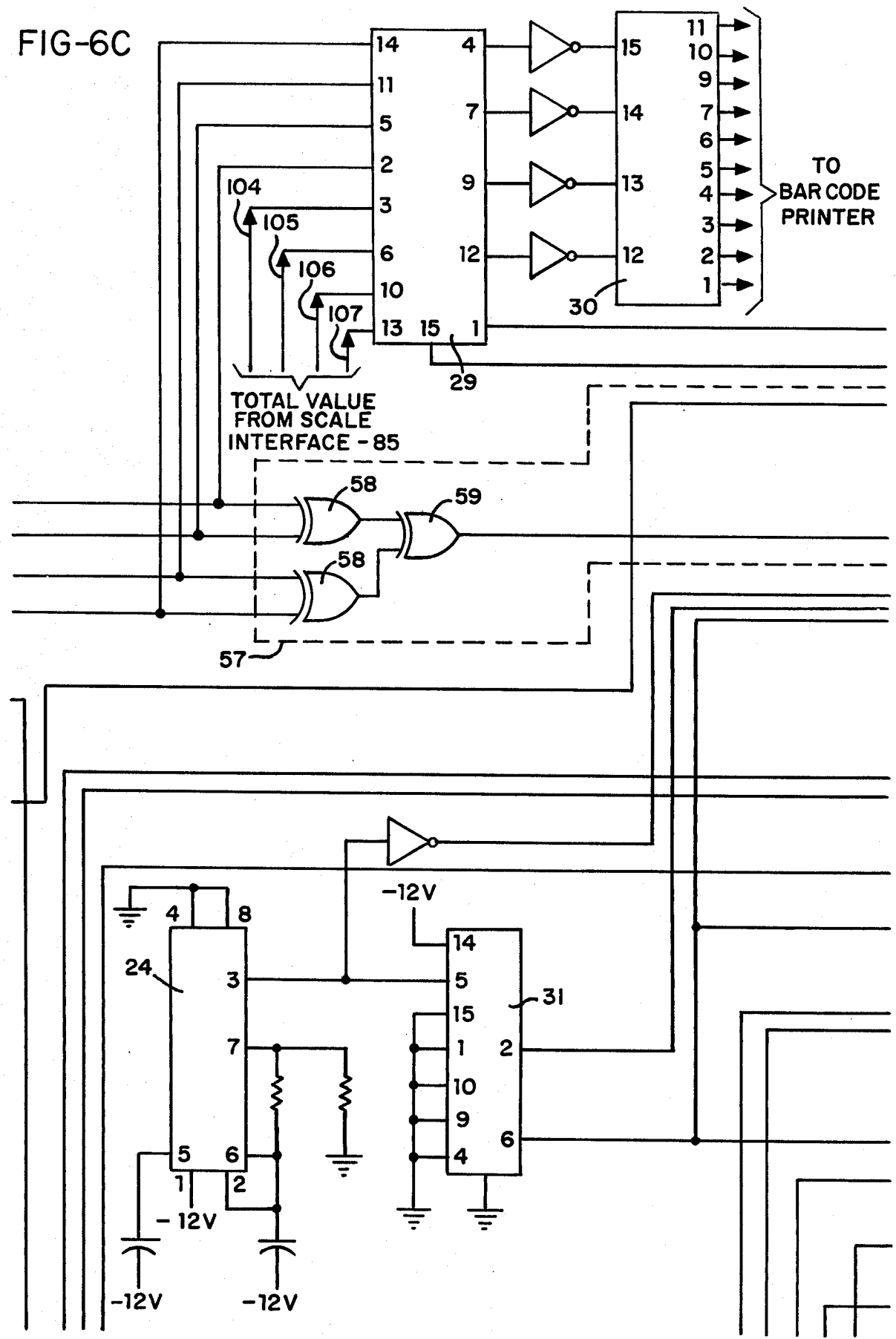

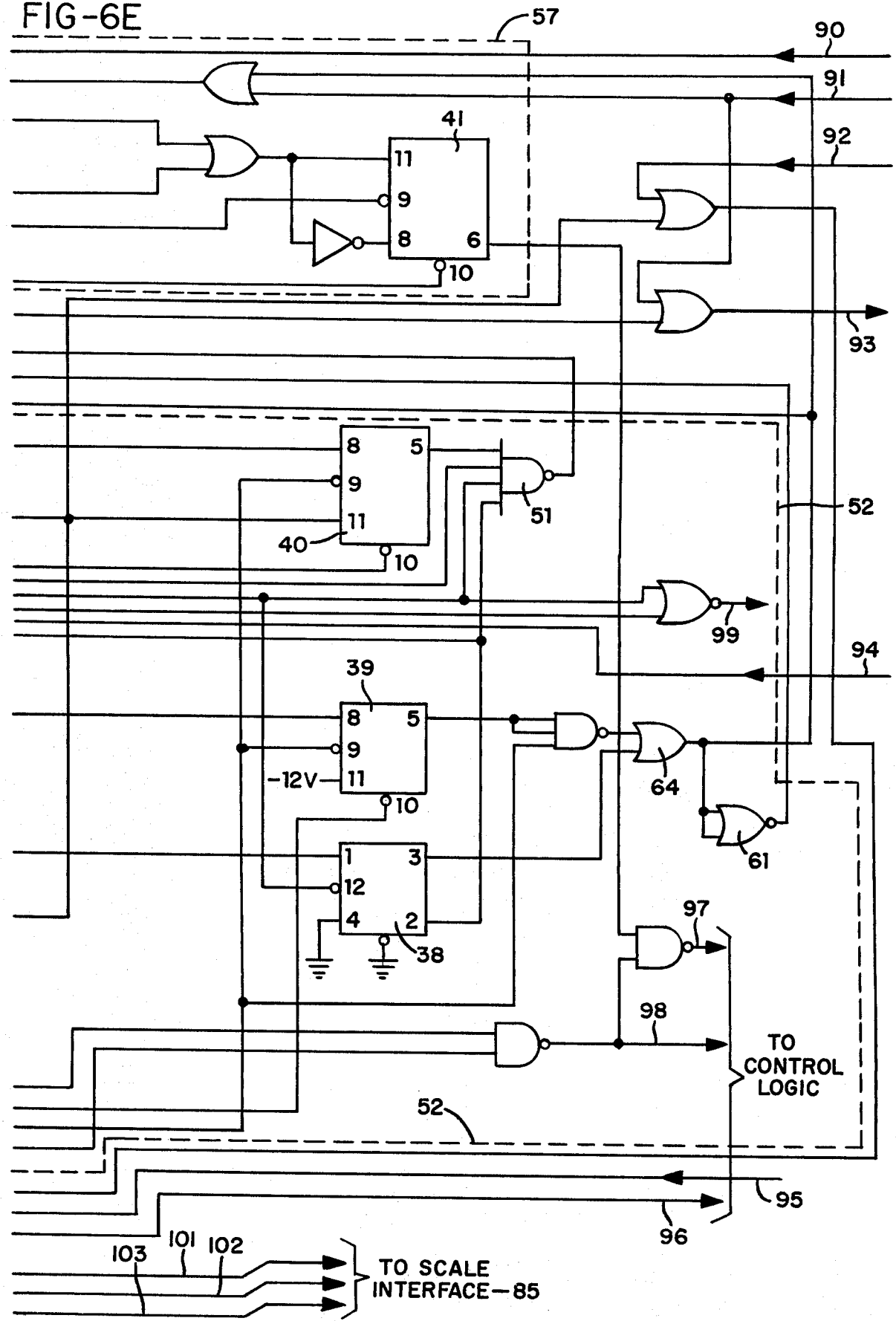

COMMODITY IDENTIFICATION APPARATUS

BACKGROUND OF THE INVENTION

This invention relates to apparatus for generation of an electrical code representative of a commodity identification for label printing apparatus or the like. Such apparatus find particular utility in combination with an automatic weighing and labeling system of a type commonly employed in large volume supermarket packaging operation. A typical system in which the present invention may be employed may be of a type as generally described in Allen U.S. Pat. No. 2,948,465. Such systems comprise a scale for weighing a commodity, such as a package of meat, a register for storing the weight of the commodity as measured by the scale, means for entering the price per pound of the commodity being weighed, means for multiplying the weight times the price per pound to obtain a total value for the commodity, and means for printing the total value, together with other appropriate information, on a label for application to the package.

Packages which have been labelled as above described are commonly placed on counters for selection by a customer, who in turn transports the selected package to a checkout station. At the checkout station a clerk reads the value printed on the package label and manually enters this value into a cash register for totalling up the customer's bill. In recent times, there has been keen interest in printing machine readable codes on such labels, so as to speed up the checkout process. Accordingly there have been developed a number of machine readable codes, the most common of which are bar codes, which may be ready by a photosensitive hand held wand or a photosensitive device mounted within the surface across which the coded package is passed.

The bar codes currently coming into use identify the manufacturer of the product and also provide a specific identification of type and size of the product. Such an identification code enables setting up of an automatic inventory control program by a computer to which the photosensitive code reading device may be attached. Furthermore, for packages of standard size, the price of the package may be stored in memory, so that the computer can provide automatic control of the operation of the cash regisiter. The bar codes for such "standard" items are preprinted on the package by the manufacturer prior to delivery to the retailer.

In the case of locally packaged products, such as produce and meat, which are sold by weight, it is necessary for the retailer to print his own machine readable label. Furthermore it is desirable that the printer for printing such machine readable labels be compatible with available computing scale systems, so that it is possible to print a machine readable code corresponding to weight or package value in addition to a product identification code. Thus the reading system will have all the information necessary for inventory control and/or automatic cash register operation.

In accordance with this invention it is proposed to provide a commodity key which conditions the labeling system for operation and which carries a machine readable code representative of the identity of a commodity being processed. Such a commodity key may also carry a type face for printing the name of the commodity in ordinary language on the label. The above mentioned Allen patent discloses a commodity key having means for conditioning the labeling system for operation and a type face for printing the name of the commodity on the label. The labels which are printed by the Allen system, however, do not carry a machine readable code.

Other prior art systems which disclose usage of commodity keys are Bell RE25,897, Bremner 3,789,193, Susor 3,459,272 and Martin 3,825,085. The commodity keys shown in each of these latter three patents carry machine readable indicia, but in each case the machine readable indicia represents the price of the commodity and does not identify the commodity itself. In the Bell patent the machine readable indicia are a series of pins which position a series of selector switches when the key is slid into place. The key of the Martin patent is similar to the Susor key, but there is provision for a parity check.

In the Bremner, Susor and Martin patents the machine readable indicia are a series of apertures for passage of light from a suitably positioned light source. Light which passes through these apertures is sensed by a series of photodiodes, which in turn cause production of a signal code representative of a commodity price. In the Susor and Martin patents, the key contains a series of apertures which are blocked on a selective basis by masks which are attached to the key. Reading of the light passing through the apertures is done with the key in place. In the Bremner patent, the key carries a series of tabs, each of which has a row of apertures representative of a price digit. Each tab also has a second row of apertures for generation of clock pulses. As the key is slid into place one photodiode senses the row of clock apertures in each of the tabs, thereby generating a clocking signal which controls the reading and storage of the price digit information.

Other U.S. Pat. Nos., Susor et al 3,459,271 and Bell 3,291,232 disclose a commodity key or plate carrying machine readable indicia, which are pins of the same general type shown in Bell RE25,897. In Susor et al U.S. Pat. Nos. 3,459,271 and Bell 3,291,232, however, the pin locations represent a commodity identification, rather than a price. The commodity price identification as indicated by these pins is transmitted to a centralized computer in which up-to-date price information is stored. The central computer transmits back to the computing weighing scale system, with which the key is associated, the price for the commodity being processed. None of the above mentioned references is concerned with the printing of machine readable codes for package labels.

SUMMARY OF THE INVENTION

This invention provides a commodity identification system which utilizes a commodity identification key, means for manually controlled clocking into storage of a commodity identification code carried by the key, means for reading the commodity identification information out of storage for control of a machine readable code printer, and means for continually checking the parity of the commodity identification as it is read from storage. The commodity identification code is preferably a series of apertures within columns of aperture spaces, and the manually controlled clocking is achieved by providing a column of clocking apertures, which are read in sequence as the key is inserted into place. The key which carries the commodity identification code preferably has a reset notch and a commodity identification printing plate for conditioning the operation of a recording scale system of the type disclosed in Allen U.S. Pat. No. 2,948,465 and for printing a human readable label as taught therein.

In one aspect of the invention there is provided a commodity identification key carrying apertures arranged in rows and columns for organization of commodity identification, parity checking, and clock control information, means for manually controlled reading of the commodity identification information into storage, and means for repeatedly reading the commodity identification information out of storage and repeatedly checking the parity thereof.

Accordingly it is an object of this invention to provide improved means for controlling the printing of a machine readable bar code representative of a commodity identification.

Another object of the invention is to provide an improved commodity identification key which can be used for control of both a recording scale system and a machine readable commodity code printer.

Still another object of the invention is to provide apparatus for manually clocking a commodity identification code into storage and thereafter repeatedly reading said code out of storage and performing repeated parity checks thereagainst.

Other objects and advantages of the invention will be apparent from the following description, the accompanying drawings and the appended claims.

BRIEF DESCRIPTION OF THE DRAWINGS

FIG. 1 illustrates a commodity key constructed in accordance with this invention;

FIG. 2 is an enlarged portion of the commodity key of FIG. 1;

FIG. 3 is a block diagram of a label printing system utilizing the commodity key of FIG. 1;

FIG. 4 is a schematic illustration of apparatus for reading the apertures in a commodity key;

FIG. 5 illustrates the organization of the data coded onto the key of FIG. 1;

FIGS. 6a through 6g present an electrical schematic diagram of apparatus for reading the code on a commodity key and generating printing control signals in response thereto;

FIG. 7 illustrates the relative positioning of FIGS. 6a through 6g for production of a complete electrical schematic diagram.

DESCRIPTION OF THE PREFERRED EMBODIMENT

Figure 6A:
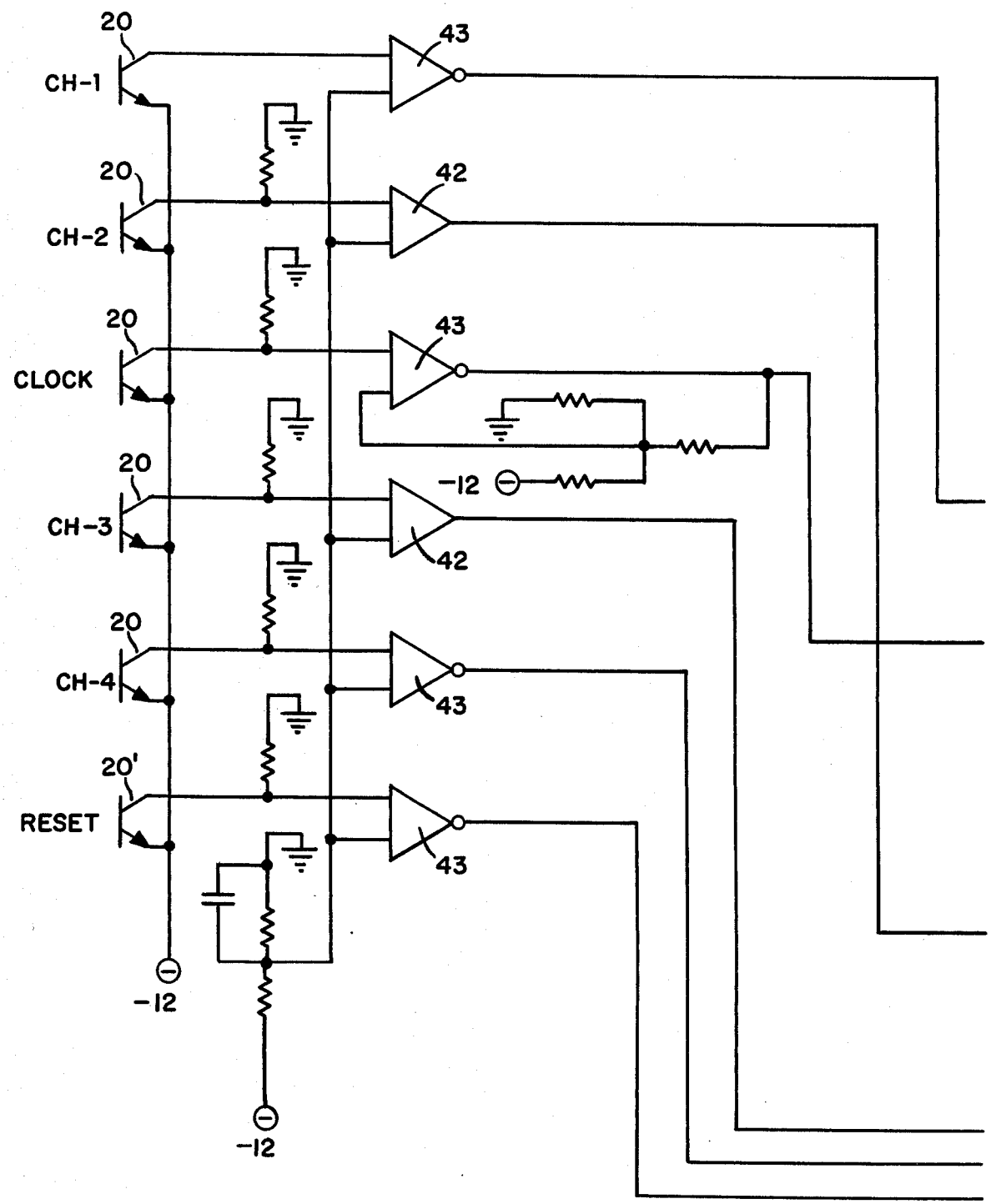
Figure 6B:
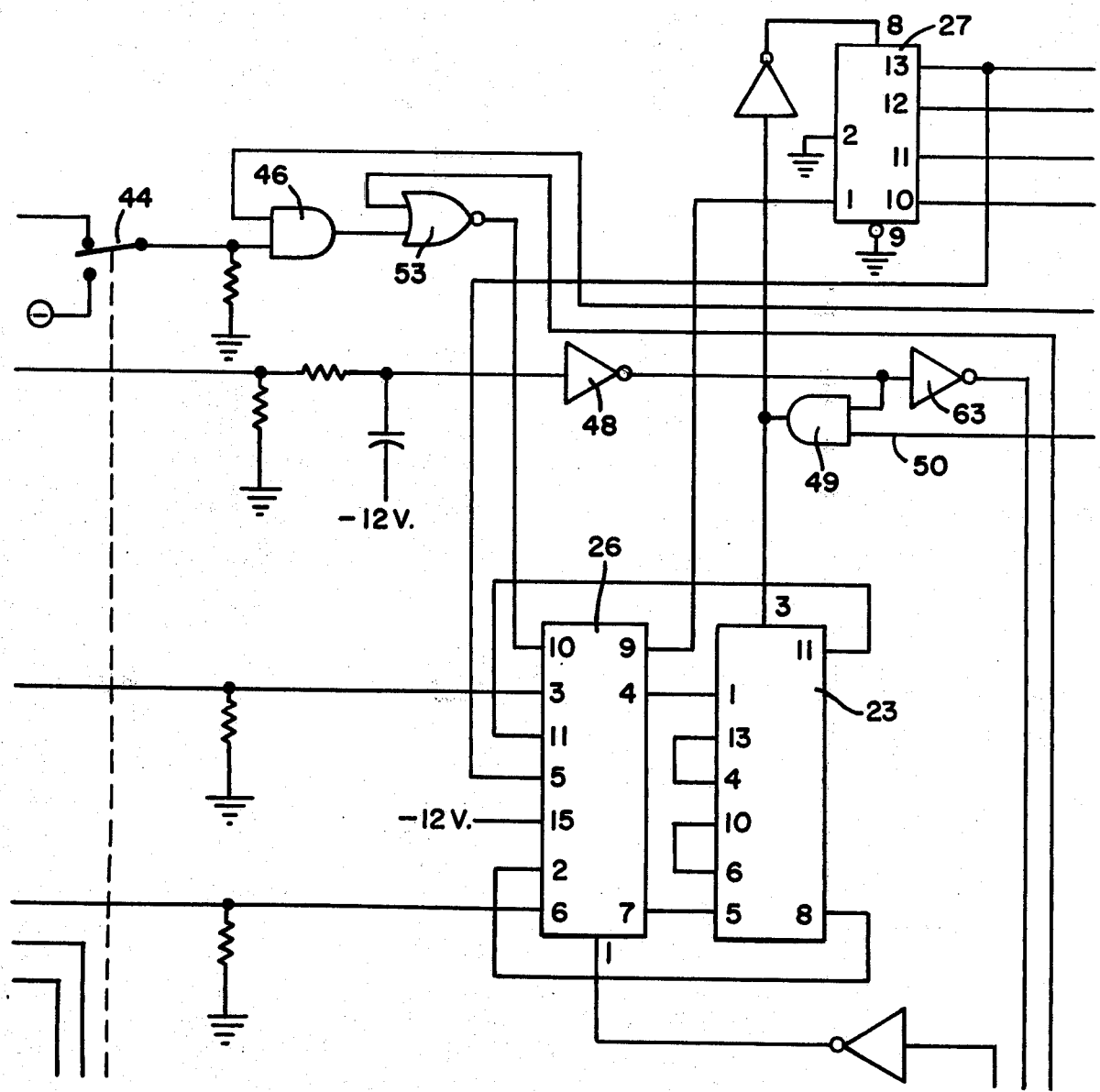
Figure 6D:
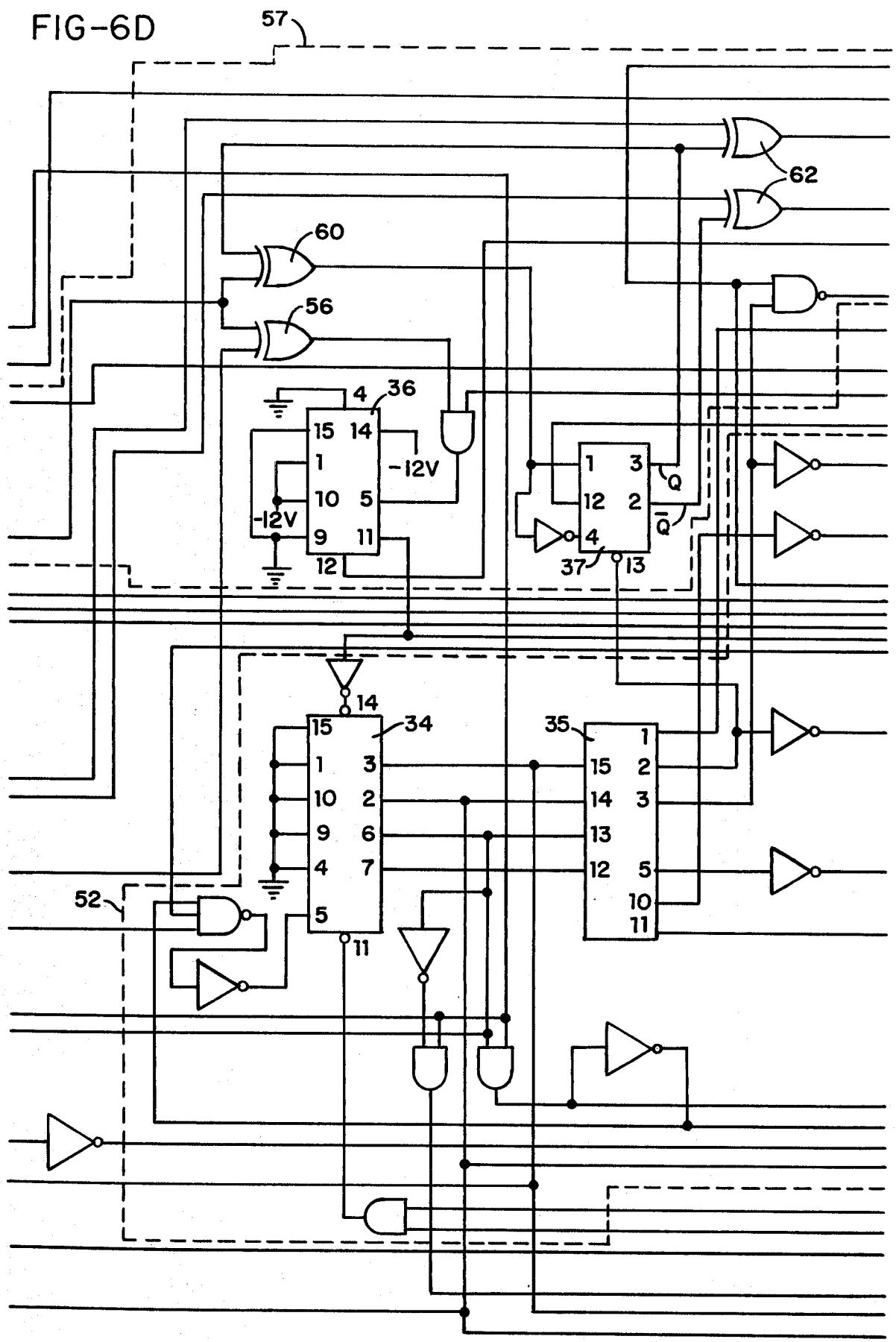
Figure 6F:
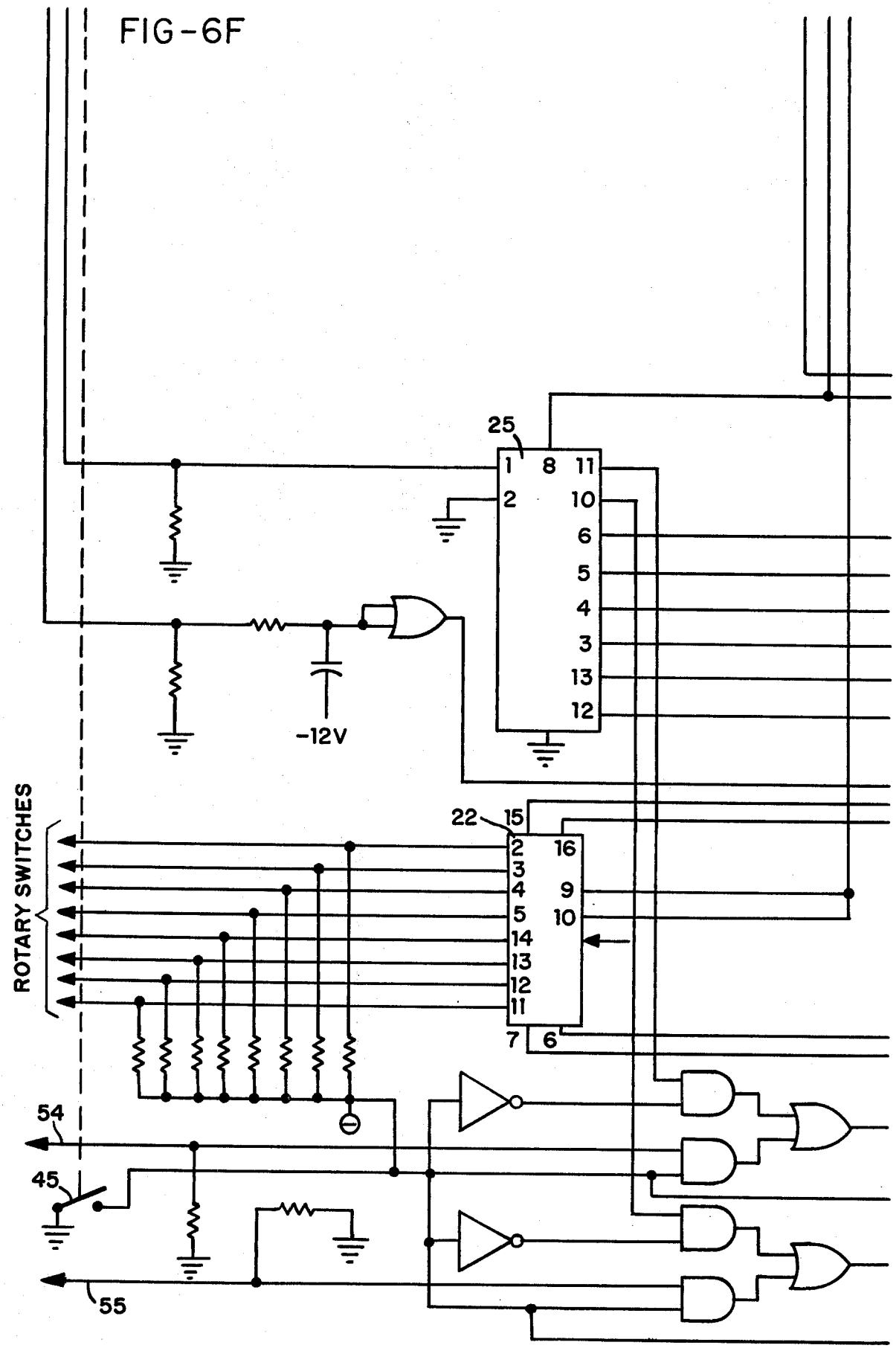

As illustrated in FIG. 1, a commodity key 10 may comprise a type face 11 for printing a human readable legend on a label and a series of apertures 12 arranged for generation of a machine readable code. Key 10 also may have a notch 13 and a large opening 14. The opening 14 is merely for hanging key 10 on a hook or the like. Notch 13 performs a dual function. One of these functions is to generate an electrical reset signal for resetting a counter which counts clock pulses created during insertion of key 10 into position within a computing scale system. The notch 13 also engages a finger for controlling operation of the computing scale system as described generally in Allen U.S. Pat. No. 2,948,465. When notch 13 engages the above mentioned finger, upon insertion of key 10 into the computing scale system, a condition is set up which inibits operation of the computing scale system until after adjustment of price-per-pound mechanism all as described in detail in the Allen patent.

Referring now to FIG. 2, it will be seen that the set of apertures 12 comprises a series of large apertures 15, which may be arranged in four longitudinally extending columns, and a series of smaller apertures 16 which are arranged in a single column. Commodity key 10 is inserted into the computing scale system in the direction of the arrow 22, and apertures 16 are positioned relative to apertures 15 such that the trailing edges of those of apertures 15 which are in the same row are in alignment with the trailing edge of their corresponding apertures 16.

Apertures 16 are clock control apertures, and their above mentioned positioning together with their smaller diameter relative to apertures 15 insures that the aperture reading mechanism, as described below, is reading information for the data apertures 15 at the time clock pulses occur. Thus it will be seen that an operator causes loading of commodity information into a register, when he inserts key 10 into the computing scale system and that the movement of the key regulates the clocking of the data loading operation.

Figure 6G:
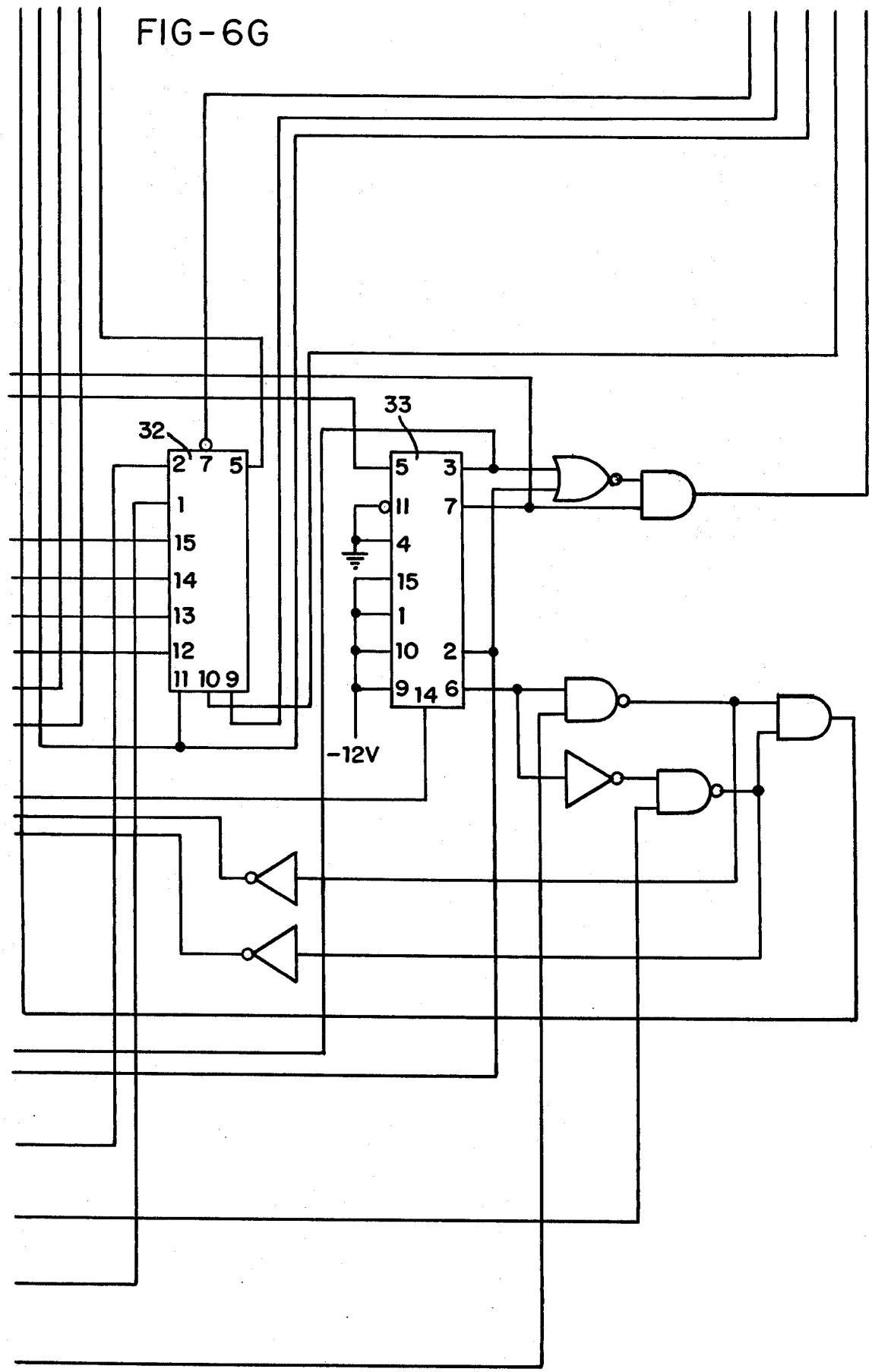

The reading of apertures 15 and 16 can be understood by referring to FIG. 4 wherein is illustrated a light source, such as a bulb 17. Below bulb 17 is placed a mask 18 having a series of apertures 19. Light from bulb 17 passes through apertures 19 to form a series of light beams 23. These light beams 23 pass through apertures 15 and 16 in key 10 for reading by a series of photodiodes 20 mounted on a suitable base 21. It will be apparent that photodiodes 20 produce data outputs only when apertures 15 and 16 come into alignment with apertures 19 of mask 18. The sole exception is photodiode 20' which senses the passage of notch 13 (the key 10 being inserted from left to right in FIG. 4 with the notch 13 being on the rearward side of the key) under a corresponding aperture 19' for resetting a binary counter 33 (FIG. 6g). As explained in detail below, this counter counts the clock pulses generated by the clocking apertures 16.

The overall system of this invention is illustrated in general block diagram form in FIG. 3 wherein there is shown a key reader 80, which includes photodiodes 20 and 20' and the logic circuitry associated therewith. The commodity identifying information output from key reader is printed by a bar code printer 81, which is also under the control of a control logic unit 82. Key reader 80 provides control logic 82 with a "data ready" signal, a clock signal, and other data as illustrated and in return receives signals to start and reset the program.

FIG. 3 also shows a scale interface unit which provides product total value signals to the key reader. These product value signals are 4-bit binary codes for each of 4 digits in the product total value. Codes representing all 4 of these digits are presented to scale interface 85 simultaneously by a computing scale system 83, and the scale interface sends these codes one at a time to key reader 80 upon request. Computing scale system 83 may be a system of the general type described in Allen U.S. Pat. No. 2,948,465 and Allen et al U.S. Pat. No. 3,557,353, and may be equipped with a label printer 84. Label printer 84 prints a human readable label, a suitable embodiment for this printer is discussed in detail in Allen '465 and also in Allen et al U.S. Pat. No. 3,196,962. The computing scale system causes label printer 84 to print the price per unit weight, the package value and weight, together with the commodity name in human readable form all as described in detail in the Allen patents. This label is in addition to the label printed by bar code printer 81. Generation of a 4 digit value code is discussed in Allen et al. U.S. Pat. No. 3,557,353.

Referring now to FIG. 5 it will be seen that for each clocking aperture 16 there are four data aperture positions arranged in a laterally extending row extending on either side of the clocking aperture 16, but that only some of these data aperture positions actually contain a data aperture as indicated at 15. As illustrated in FIG. 5, eight clock apertures, comprise the clocking channel, and four data channels, I through IV, which carry commodity identification information and parity information comprise the data channels. FIG. 5 illustrates a commodity key layout containing six words of commodity information, with two 4-bit words in each of channels 1, 2, and 3. Parity information is contained within channel 4.

FIG. 5 illustrates each of the six word positions and also the parity positions, which correspond to each data word. The first data word is treated by the information handling system as the most significant word, and the lowermost data aperture position generates the most significant bit within each word.

The key reading system, as described in more detail with reference to FIGS. 6a through 6g employs an odd parity check, for each 4-bit word of data and therefore the commodity key, as illustrated, has an aperture (a parity bit) in the first word parity position 71. The reason for this is that the first data word as illustrated has two apertures. Thus an aperture appears in the first word parity position 71 to provide an odd number of bits in the combination of the word and its parity character. Likewise, as illustrated in FIG. 5, an aperture appears in the fifth word parity position 75, but no apertures appear in the parity positions for the 2nd, 3rd, 4th and 6th word parity positions 72, 73, 74, and 76.

FIG. 5 also shows "even parity" and "odd parity" aperture positions, 78 and 79 respectively, at the start of channel 4. These parity positions provide a second parity check, an "entire key" parity check over and above the "word" parity check on each of the words. As illustrated in FIG. 5, the six data words contain a total of 10 apertures, which is an even number. Thus no aperture appears in the entire key "even parity" position 78, but an aperture does appear in the "odd parity" position 77. An aperture will always appear in one or the other of the "even parity" or "odd parity" positions depending upon whether an even or an odd number of apertures 15 appear in the six data words of the entire key.

Electrical circuitry for reading apertures 15 and 16 and reset notch 13 is illustrated in FIGS. 6a through 6g and comprises primarily a set of solid state digital modules. In the preferred embodiment as illustrated in FIGS. 6a through 6g, three of the modules 22 through 24 are manufactured by Motorola Inc. and have circuit identification numbers as will be given below. Pin numbers for these circuits correspond to pin numbers given on the manufacturer's data sheets. Other solid state circuits 25 through 41 are manufactured by National Semiconductor Corp. and again the pin numbers correspond to numbers on the manufacturer's data sheets for the circuits.

These schematic diagrams show the photodiodes 20 and 20' as providing output signals to both non-inverting amplifiers 42 and inverting amplifiers 43 the circle at the amplifier output identifying the inverting amplifiers. FIG. 6a indicates the channel for which each of the photodiodes provides output information. Non-inverting amplifiers 42 provide a LO output when their photodiodes are observing apertures in commodity key 10, and inverting amplifiers 43 provide HI outputs when their photodiodes are observing apertures in commodity key 10.

As indicated by the schematic, the channel I output goes through a switch 44 which is ganged with another switch 45 for mutual operation. When switch 44 is in the up position as illustrated, the channel I output is fed via AND gate 46 and NOR gate 53 to pin 10 of multiplexer 26, which is a circuit number MM74C157. Multiplexer 26 transfers this channel I information from input pin 10 to output pin 9, from which it is transferred into an 8-bit shift register 27, which is a circuit MM74C164. Shift register 27 serves initially as part of the storage register for channel I information; later in the program register 27, which is provided with output terminals, receives and transmits to multiplexer 29 information from channels 2 and 3 on a cyclic basic, as will be explained below. 2

The information from channels 2 and 3 are applied to pins 3 and 6 respectively of multiplexer 26, and from there the information is transferred to output pins 4 and 7 respectively. Output pins 4 and 7 of multiplexers 46 are connected respectively to input pins 1 and 5 of a 16-bit shift register 23, which stores channel 2 and channel 3 information. Shift register 23 is a circuit type MC14006CP. Multiplexing allows the input terminals of shift register 23 to receive new data from commodity key 10 during one portion of the system operation and to receive recirculated shift register data during another portion of the system operation.

Clocking pulses caused by passage of light through clocking aperture 16 to the clocking photodiode 20 are fed through a noise filtering network 48a and an inverting amplifier 48 to an AND gate 49, which is enabled by a HI signal appearing on line 50 during the key reading program. The manually generated clock pulses from inverting amplifier 48 are fed by AND gate 49 to the clock terminals of shift registers 23 and 27 and also via another inverting amplifier 63 to the clock terminal of a parity storage register 25, which is a circuit type MM 74C164, and to a binary counter 33, which is a circuit type MM74C193. After commodity key 10 has been fully inserted and is seated in place, registers 23 and 27 are loaded with six words of commodity data information, and the system is ready to begin making parity checks and reading out commodity identification codes. At this point binary counter 33 has gone through eight counts from the 8 clock pulses and is standing at a binary 8 (1000). This causes a HI at output terminal 7 of counter 33, which in turn causes an internal switching of multiplexer 26 so that output terminal 9 thereof is connected to input terminal 11, output terminal 4 is connected to input terminal 2 and output terminal 7 is connected to input terminal 5. It will be seen that counter 33 stands at a count of 8 until reset by the next reading of reset notch 13. Thus the data read out from key 10 may be used repeatedly as described below.

All parity checking, output reading, and related program functions are under the control of an internal program counter 31, which is controlled by a clock oscillator circuit 24. Circuit 24 may be a circuit type MC1455P, and counting circuit 21 may be a circuit type MM74C193. The output of oscillator 24 appears at pin 3 thereof and has a period of about 3 milliseconds as determined by the attached RC elements. After shift register 23 and 27 have been loaded and multiplexer 26 is switched as above described then the channel I data, which is stored in shift register 27, is read out to pins 2, 5, 11 and 14 of multiplexer 29, which may be a circuit type MM74C157. Other information may be supplied to pins 3, 6, 10 and 13 of multiplexer 29 in the form of total value information, which comes from scale interface circuit 85.

Initially the first four bits (first data word) of channel I information appear at the output terminals of register 27, and these bits are read by multiplexer 29 upon appearance of a strobe at terminal 15 thereof (a LO signal being assumed present at terminal I of multiplexer 29). This reading of the first word of commodity identification information occurs during step 2 of the program developed by program controls 34 and 35 as discussed below; the data so read is applied to a decoder 30, which is a circuit type MM74C42 and which decodes a 4-bit BCD coded input to create a LO signal on one of 10 output lines. These output lines operate a bar code printer as hereinafter discussed. The multiplexer 29 therefore serves to couple alternately the total value information or the commodity code information to the bar code printer at selected operating time periods.

After the first word of commodity identification information has been read, then an AND gate 51 (FIG. 6E) within program logic unit 52 generates 4 clock pulses on line 50. At this time the output from inverting amplifier 48 is HI, so that AND gate 49 is enabled and the 4 clock pulses on line 50 shift all the commodity identification data stored within registers 23 and 27. As a result of this shifting, assisted by the above mentioned internal connections within multiplexer 26, the first four bits of commodity code data which has been stored in regsiter 27, where it is accessible to the multiplexer 29, is shifted into the lower half of register 23 via input pin 5 of register 23 and a connection between terminals 5 and 7 of multiplexer 26. During this shifting the second word of commodity code data which has been stored in the top half of register 23 is shifted into register 27 where it is accessible to the bar code printer via multiplexer 29. This shifting into register 27 occurs via a connection between pins 11 and 9 of multiplexer 26. Also during this shifting the third word of commodity code data which has been stored in the lower half of register 23 is shifted into the top half of register 23 via a connection between pins 2 and 4 of multiplexer 26. In summary when the proper connections are made inside multiplexer 26 the registers 23 and 27 form one continuous shift register with the upper 4 bits of this shift register having output terminals which are used for accessing the shift register data. This the shift register data. This shifting of data within registers 23 and 27 continues until all six commodity code words have been read into the multiplexer from the output terminals of register 27 and the data has been shifted back into its initial storage locations within the registers. The shifting cycle can be repeated any number of times for printing the commodity code data as many times as desired.

As mentioned above, the channel I data passes through a switch 44, which is ganged together with a switch 45. Enroute from switch 44 to pin 10 of multiplexer 26, the channel I data passes through a NOR gate 53. NOR gate 53 also has an input from multiplexer 22, which is a circuit type MC 14529. Multiplexer 22 has eight input lines, which may represent the output of a pair of rotary switches or the like. These rotary switches may generate two words of data information, which may be substituted for the two words generated by channel I as described above. The eight bits of data generated by such switches are clocked out of multiplexer 22 under the control of the key clock and are transferred from NOR gate 53 to pin 10 of multiplexer 26 and treated as if they represented key data when switches 44 and 45 are in the down position. When switch 45 is in the down position, parity information generated by switches attached to lines 54 and 55 appears at pins 1 and 2 of multiplexer 32, which is circuit type MM74C151. The parity data on lines 54 and 55 provides a parity check for the two data words represented by the input signals to multiplexer 22. These two data words could represent special commodity information; since the four words 3 through 6, will usually be sufficient for identification of the commodity.

When switches 44 and 45 are in the normal up position, the parity information supplied to terminals 2 and 1 of multiplexer 32 comes from pins 11 and 10 respectively of parity storage register 25. Parity storage register 25 is loaded by the output from the photodiode which reads channel 4 of commodity key 10, and therefore contains the key information illustrated at 71–78 in FIG. 5 commencing with the lower most bit, 78.

Output pins 6, 5, 4 and 3 respectively of register 25 indicate parity information for data words 3 through 6, and this parity information is supplied directly to multiplexer 32. The parity information is shifted into storage register 25 by the key clock appearing at the output of amplifier 63. Once in register 25 storage the parity data is not circulated or shifted in the manner of data stored in registers 23 and 27 but is instead accessed one bit at a time by multiplexer 32. The parity bits representing the above mentioned "even parity" and "odd parity" appear respectively at pins 13 and 12 of register 25. This even and odd parity information is supplied from register 25 to a pair of exclusive OR gates 62, FIG. 60, as illustrated Parity checking is under the general control of a parity logic unit 57, FIG. 6E, comprising a binary counter 36, a J-K flip-flop 37, a J-K flip-flop 41, and various gates and amplifiers as illustrated. Counter 36 may be a circuit MM174C193, while flip-flops 37 and 41 may each be a circuit type MM174C107. Flip-flop 41 is used to store the final determination as to whether both the word parity and entire key parity checks have been satisfied.

It will be seen that the four bits representing each of the six data words appear 4 bits at a time at a pair of exclusive OR gates 58 simultaneously with their appearance at the input to multiplexer 29. The output from exclusive OR gates 58 are applied to exclusive OR gate 59 so that for each data word having an even number of bits there will be a LO output from exclusive OR gate 59, and for each data word having an odd number of data bits there will be a HI output from OR gate 59. The output from exclusive OR gate 59 is applied to exclusive OR gates 56 and 60 which respectively provide inputs for binary counter 36 and J-K flip-flop 37. Exclusive OR gate 60 also receives the Q output of flip-flop 37, and exclusive OR gate 56 also receives parity bits from multiplexer 32. Exclusive OR gate 59 thus performs a parity check for each word read out from register 27, and each correct check produces a HI output from exclusive OR gate 56.

HI outputs from exclusive OR gate 56 are counted by counter 36, and after six consecutive correct parity checks are made representing the six data word, then output pin 12 of counter 36 generates a clocking pulse at input pin 9 of flip-flop 41. The J and K inputs for flip-flop 41 are provided by a set of exclusive OR gates 62 which receive inputs from flip-flop 37 and also from even and odd parity terminals 12 and 13 of parity storage register 25.

The operation of counter 36 and the associated circuits may also be explained as follows. Binary counter 36 is preset to a count of 9 via an input on pin 11; upon receiving an indication of six correct word parity comparisons, i.e., six pulses at pin 5 a count of 15 is attained in counter 36 and a signal is provided at the pin 12 output according to the selected parity implementation. The six pulses from exclusive OR gate 56 are generated by the inputs to gate 56 being non alike. The counter pin 12 signal indicating correct word parity is applied to the clock input pin 9 of the parity indicating flip-flop 41. In the presence of the appropriate J and K inputs at pins 8 and 11 flip-flop 41 will indicate the satisfaction of both the word and entire key parity tests; the entire key parity check signals being applied to pins 8 and 11.

Flip-flop 37 tells whether the number of data bits in the six data words is odd or even, and if exclusive OR gates 62 verify this against the odd/even parity stored in register 25, then a LO signal is generated at input terminal 11 of flip-flop 41, and a HI signal is generated at input terminal 8 of flip-flop 41. This causes a LO output to be generated at pin 6 of flip-flop 41 upon generation of the clock signal which signified correct parity in all six data words at pin 9 of flip-flop 41.

In summary, the entire key parity check is performed by exclusive OR gate 60, flip-flop 37, and exclusive OR gates 62 and 62a. The output of flip-flop 37 indicates whether the total number of bits in the data stored in register 23–27 is even or odd. This is accomplished by presetting flip-flop 37 to the even parity state with Q high and then changing this state each time the word parity examining gates 58 and 59 locate a word of odd parity. The final status of flip-flop 37 thereby indicates whether the key data contain an odd or even number of bits.

The ood or even entire key parity indication read from the commodity key appears on pins 12 and 13 of parity storage register 25; these signals are compared with the odd or even data indication from flip-flop 37 in the exclusive OR gates 62. If the data parity signals and parity check signals applied to gates 62 are in agreement signals are applied to the J and K inputs, pins 8 and 11, of flip-flop 41 to place flip-flop 41 in the state indicating satisfaction of both the word and entire key parity tests.

The LO signal from pin 6 of flip-flop 41 is supplied via line 97 to control logic 82 (FIG. 3), which may operate a bar code printer 81. A double parity check is therefore made. Moreover, this double check is made initially prior to data use by cycling once through the program before beginning operation of the bar code printer. Thereafter the same double parity check is made before each printing operation.

Program logic unit 52 comprises a binary counter 34, a BCD to decimal decoder 35 and flip-flops 38, 39 and 40. Counter 34 is a circuit MM74C193, decoder 35 is a circuit MM74C42, and the three mentioned flip-flops are J-K flip-flops circuit type MM74C107. Binary counter 34 operates as an up counter by counting clock pulses from counter 31. These clock pulses are applied to pin 5 of counter 34 and a resulting four bit binary code appears at pins 3, 2, 6, and 7 thereof. The operation of the program logic begins with an input at pin 14 of counter 34, and this input originates within control logic (82). Another signal from the control logic resets counter 34 at the end of each printing operation.

Decoder 35 converts the 4-bit binary code from counter 34 into a decimal code, so that HI outputs appear at pins 1, 2, 3, 5, 10 and 11 thereof alternately during different steps of the program. The outputs from decoder 35 control flip-flops 38, 39 and 40, which in turn control the outputs from NAND gate 51 and NOR gate 61. The output from NAND gate 51 provides six groups of data shift pulses, as above described, and the output from NOR gate 61 provides a strobe for control of counter 36 within parity logic unit 57. The program logic also provides data control signals for the computing scale system.

The program carried out by the system operates under the control of counter 34, and the home count for the counter is 15 (binary 1111). The program is started by a signal at terminal 14 of counter 34, which causes the output count to go to 0000. Counting pulses for counter 34, as applied to input terminal 5 thereof, then cause program counting. Count pulses for counter 34 are produced at output terminal 6 of counter 31, so that the counter 34 operates at a frequency which is one-fourth the operating frequency of clock 24.

During program step 1 (binary count 0001) nothing happens, but during steps 2 through 7 (counts 0010 through 0111) six digits of commodity code are read out by register 27. These digits of commodity code are multiplexed through multiplexer 29 to cause a LO output at one of 10 output lines from decoder 30. The commodity codes read out from register 27 also go through a parity check as discussed above. The first time through the program, the bar code printer 81 is inoperative, and the purpose of the first program cycle therefore is to check the parity of the data loaded into registers 27 and 23.

If a correct parity check is made, then key reader 80 sends a signal on line 93 to control logic 82 to condition bar code printer 81 for operation. Thereafter control logic unit 82 responds with a signal on line 95 which resets counter 34 to its home count of 15. Thereafter control logic 82 sends another signal on line 94 which again starts the program count. During counts 2 through 7 of this second cycle, six digits of commodity codes are again read out from register 27, but this time bar code printer 81 responds by printing a corresponding bar code. However, parity logic unit 57 continues checking the parity of the commodity codes, and a parity error during any program cycle produces an error signal on line 97, which is connected to control logic unit 82. A parity error signal on line 97 inhibits operation of the printer, and no more bar code printing is possible until after the commodity key has been pulled entirely out of its seat and then replaced.

So long as no parity error is detected, bar code printer 81 prints a bar code corresponding to the six commodity codes read out from register 27 and then continues by printing a bar code corresponding to the total value of the commodity being weighed by computing scale system 83. The total value is available as a BCD code at input terminals 3, 6, 10 and 13 of multiplexer 29, and this code is transmitted to decoder 30 upon generation of a strobe signal by OR gate 64. OR gate 64 is connected as illustrated in FIG. 6e to flip-flops 38 and 39, so that the strobe for multiplexer 29 is generated at the appropriate time. There are three output lines 101, 102 and 103, which are connected from program logic unit 52 to scale interface 85. Signals on these lines cause the scale interface unit 85 to send back to multiplexer 29 four digits of commodity value information during program steps 8 through 11 (counts 1000 through 1011). These digits of commodity value information are sent via lines 104 through 107 in response to the codes sent out by program logic unit 52 on lines 101 through 103.

The first digit of commodity value information is a 4-bit binary representation for the $10 decimal digit. The next digit of value information is the $1 digit followed by the dimes and pennies digits respectively. After the pennies digit has been transmitted to multiplexer 29, the program counter has reached a count of 12 (1100). No further counting takes place and the program counter rests at this point.

After a label has been printed, control logic unit 82 generates another signal on line 95, which resets program counter 34 to the home position of 1111. When bar code printer 81 is ready to print a new label, then another program start signal is generated on line 94. It will be appreciated that the nature of the connections between key reader 80 and control logic unit 82 depends upon the control logic design, and this in turn depends upon the type of printer being controlled. The system described in detail herein has been especially designed for operating in combination with an INTERMEC UPC printer model 8109A manufactured by Interface Mechanisms, Inc. of Mountlake Terrace, Washington. This printer prints a bar code known throughout the supermarket industry as the "Universal Product Code," and the control logic unit 82 which is not described in detail herein, has been designed to operate that printer. Other printers such as, for instance, the bar code printer shown in Wolfheimer U.S. Pat. No. 3,820,456 could also be employed, in which case control logic 82 would have a different configuration. Regardless of the type of printer employed, the illustrated embodiment causes decoder 30 to generate 10 sequential LO outputs representative of six commodity identification digits and 4 commodity price digits, and these outputs set up the printer for printing out of an appropriate machine readable code. For operation in combination with the above mentioned INTERMEC printer, there are ten communication lines 90 through 99 between the key reader 80 and control logic unit 82. The functions of lines 93, 94 and 95 have been described above. Line 90 carries a reset signal for flip-flop 41, which is generated when power is applied to the printer 81. This reset signal may also be generated upon the happening of other conditions within the printer as desired. The signals on lines 91 and 92 are inverse signals and inhibit transmission of any data to the printer until the printer has completed printing of previously transmitted data upon a label then in process.

Line 99 carries clock signals for use by the control logic, and line 97 carries a parity error signal which is generated as above described. Line 98 carries a busy signal which tells the control logic that the program logic unit is busy, and line 96 carries the "data ready" signal which tells the control logic that a predetermined condition such as sensing at least eight clock pulses and not more than 8 clock pulses or alternately at least eight clock pulses but not 9 clock pulses or 10 clock pulses has been met. The exception for 9 clock pulses and 10 clock pulses is to guard against the possibility of reading one or two extra clock pulses from the commodity key due to the presence of a speck of dust particle in a clock aperture.

In addition to the logic components illustrated in FIGS. 6a through 6e, key reader 80 also contains additional circuitry for generation of a check digit used in connection with the printing of the Universal Product Code and described in the previously referred to UPC publications. The technique for calculation of such check digits is well known, and circuitry for such purposes has been omitted from the disclosure hereof for purposes of simplicity.

Figure 8:
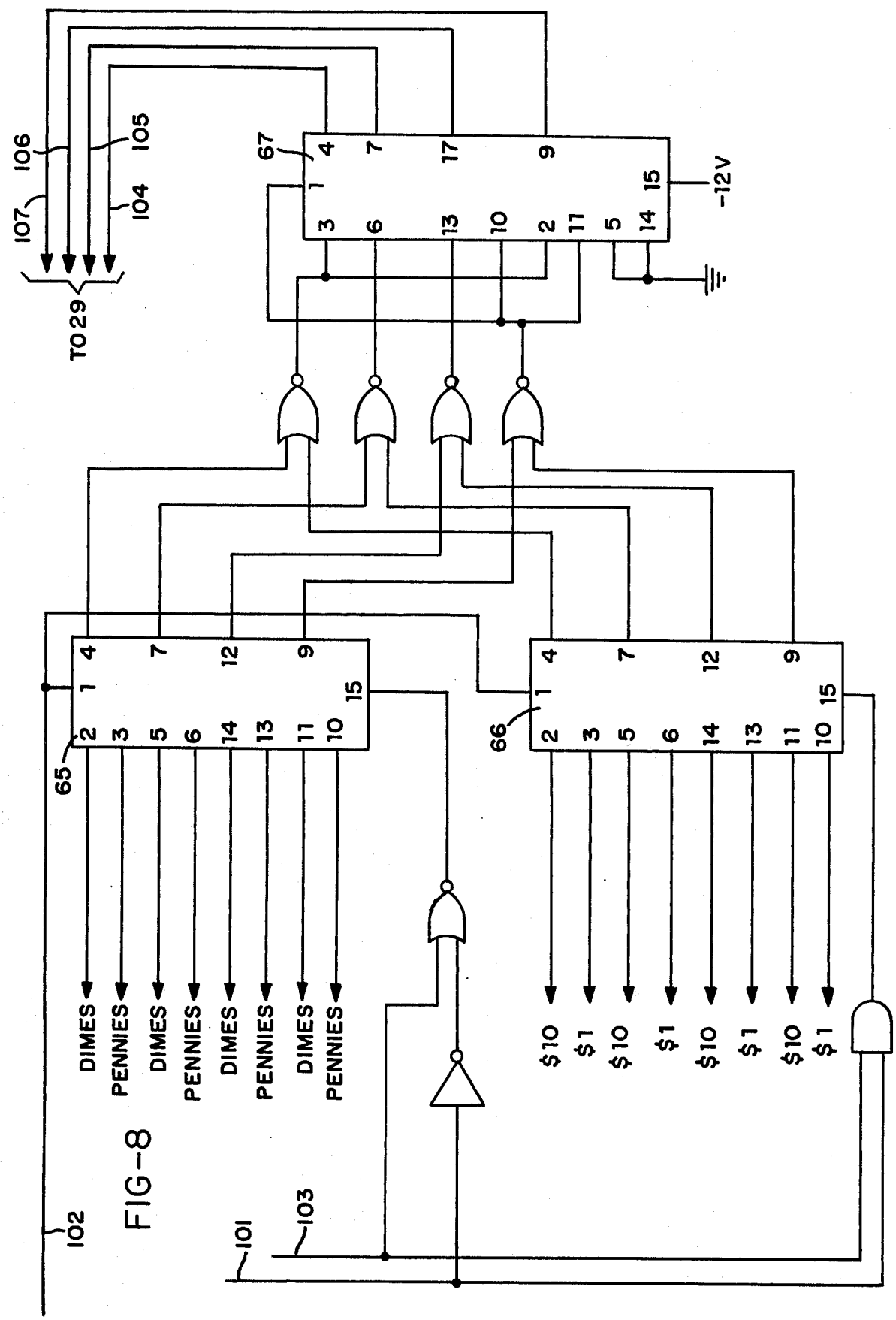
FIG. 8 is an electrical schematic diagram of a scale interface circuit.

FIG. 8 illustrates the circuitry for scale interface unit 85, the connection between this unit and key reader 80 being by lines 101 through 107, as described above. Scale interface unit 85 comprises primarily three multiplexers 65 through 67 which may be circuit types MM74C157. Mulitplexer 66 has eight inputs representing the $10 and $1 digits of price information. There are also eight inputs for multiplexer 65 which represent the digit of dimes and pennies price information. All of the price information supplied to multiplexers 65 and 66 is in the form of a modified BCD code or aiken code as generated by a computing scale system of the type in Allen et al U.S. Pat. No. 3,557,353. In this code the binary expressions for the numbers 0 through 7 are the same as for a normal binary code, but the number 8 is represented by the code 1110, while the number 9 is represented by the code 1111. The $10, $1, dimes and pennies information is read in sequence from multiplexer 65 and 66 under selection control of three bit codes appearing on lines 101 through 103, and this information is supplied as a series of four-4 bit words to multiplexer 67. The function of multiplexer 67 is to convert the above mentioned modified BCD code into a standard BCD code for application to lines 104 through 107. For use in combination with a computing scale system which generates price information in a standard BCD code, multiplexer 67 would be unnecessary.

What is claimed is:
1. Label printing apparatus comprising:
a commodity key comprising a plurality of rows of aperture spaces arranged in a plurality of columns, with one of said columns having an indicium in each space to serve as a clocking mark and with indicia in others of said spaces representing commodity identification information and partly checking information for said commodity identification information,
receiving means for receiving said commodity key and reading said commodity identification information and said parity checking information in response to the movement of said clocking indicia during the seating of said key in said receiving means, first storage means for storing said commodity identification information and connected for recirculating said information therethrough without loss thereof, second storage means for storing said parity information, program control means for generating data reading strobe signals, parity checking strobe signals and data shifting clock signals, data reading means responsive to said data reading strobe signals for progressively reading out the commodity identification stored in said first storage means, means for transmitting said data shifting clock signals from said program control means to said first storage means and causing aforesaid recirculating shifting of said commodity identification information, parity checking means responsive to said parity checking strobe signals for progressively reading out said parity checking information from said second storage means in synchronism with the reading out of said commodity identification information and progressively performing a parity check thereagainst, a printer for printing a machine readable commodity identification code in response to the reading out as aforesaid of said commodity identification information, means for inhibiting the operation of said printer if said parity checking means detects a parity error, and means for resetting said program control means to cause continuation of aforesaid reading, parity checking and printing operations so long as no parity error occurs and said printer is in condition for operation.

2. Apparatus according to claim 1 wherein said commodity key has at least one space in reserve for a parity check upon the entire field of commodity identification information upon said key and said parity checking means performs an overall parity check in accordance with the presence or absence of an indicium in said space.

3. Apparatus according to claim 2 wherein all of said parity checking spaces are arranged in a single column.

4. Apparatus according to claim 3 wherein all of said indicia are apertures in said key and said reading means comprises means for shining light through the apertures and a light responsive photocell for each aperture column.

5. Apparatus according to claim 4 wherein said commodity key further comprises a reset notch, and said reading means comprises a photocell responsive to the passage of said notch therepast for conditioning the operation of said label printing apparatus.

6. Apparatus according to claim 5 wherein said commodity key has two overall parity checking spaces reserved in the column of parity checking spaces, one of which spaces contains an aperture only if there are an even number of commodity identification code apertures and the other of which contains an aperture only if there are an odd number of commodity identification code apertures; said parity checking means performing said overall parity check in accordance with a check of both of said spaces.

7. Apparatus according to claim 1 further comprising means for inhibiting printer operation until after said commodity information has been completely read one time and a correct parity check has been made thereon.

8. Apparatus according to claim 1 further comprising means for weighing and computing the value of a product identified by said commodity identification code, and means responsive to said program control means for causing said value to be read by said data reading means and printed by said printer in a machine readable code on a label adjacent the code identifying said product.

9. Apparatus according to claim 1 further comprising means to enter alternate data in said first storage means in place of the data read from a portion of said commodity key.

10. Apparatus according to claim 9 further comprising means to enter parity checking information in said second to the parity of said alternate data and means for causing said alternate data and its corresponding parity checking information to be read into storage in synchronism with the movement of said clocking apertures during the seating of said key in said receiving means.

11. Apparatus for reading a commodity code comprising:

a commodity key provided with a plurality of clocking apertures arranged in a longitudinally extending column, an area of commodity identification cells with data corresponding to said commodity code being represented by apertures in selected data cells within said area, a plurality of parity cells also arranged in a longitudinally extending column with apertures being placed in selected ones of said parity cells to provide a parity check for the code represented by the apertures in said data area, and a reset aperture displaced both longitudinally and laterally from said clocking apertures and from said commodity identification and parity cells; said clocking apertures and said commodity identification and parity cells being arranged in parallel laterally extending rows each of which certain one clocking aperture, one parity cell and a plurality of commodity identification cells, receiving means for receiving and guiding said commodity key in the longitudinal direction, light beam generating means for generating a plurality of laterally displaced light beams which are normally blocked during insertion of said commodity key in said retaining means but which are selectively and momentarily unblocked by aligning passage of said apertures therepast; said beam generating means generating a first light beam for momentary alignment with said reset aperture, a second light beam for alignment in sequence with each of said clocking apertures, a third light beam for alignment in sequence with each of the cells in said column of parity cells, and a set of four light beams for scanning said columns of commodity identification cells and coming momentarily into alignment with each of the cells therein, first reading means for sensing the passage of said first light beam through said reset aperture and generating a reset signal in response thereto;

second reading means for sensing the passage of said second light beam through said clocking apertures and generating a series of clock pulses in response thereto, third reading means for sensing the passage of said third light beam through the apertures in said parity cells and generating a binary parity signal, the state of which at any time is representative of the blockage or non blockage of said third light beam by said commodity key, fourth reading means for sensing the passage of said fourth light beams through commodity identification cell apertures which come into alignment therewith and generating a set of binary commodity identification signals the state of each of which is at any time representative of the blockage or non blockage of an associated fourth light beam by said commodity key, sampling means for sampling said parity signal and said commodity identification signals in synchronism with the generation of said clock pulses to generate a series of parity bits and a series of commodity identification bits, storage means for storing said commodity identification bits and said parity bits, counting means for counting said clock pulses, means connecting said counting means to said first reading means for resetting said counting means upon occurrence of said reset signal, unloading means for unloading said commodity identification bits from said storage means in the form of character codes and unloading said parity bits from said storage means in synchronism with the formation of said codes, and parity checking means for checking the parity of each of said character codes against a corresponding parity bit and generating a parity error signal when an improper parity check is detected.

12. Apparatus according to claim 11 wherein said commodity identification cell apertures, said parity cell apertures, and said clocking apertures are all circular with the commodity identification cell apertures and parity cell apertures being of common size and said clocking apertures being of common but smaller size.

13. Apparatus according to claim 12 wherein said clocking apertures are longitudinally positioned for alignment of their leading edges with the leading edges of the commodity identification cell apertures and parity cell apertures which are in corresponding rows.

14. Apparatus according to claim 11 wherein the column of parity cells in said commodity key contains at least one cell for a parity check against the entire field of said commodity identification cells and wherein said apparatus contains second parity checking means responsive to the presence or absence of an aperture in said cell for checking the overall parity of said commodity identification codes and generating a parity error signal when an overall parity error is detected.

15. Label printing apparatus comprising:

a commodity key comprising a human readable type face identifying a commodity, a reset notch, and a plurality of rows of aperture spaces arranged in a plurality of columns, with one of said columns having an indicium in each space to serve as a clocking mark and with indicia in others of said spaces being commodity identifying information and parity checking information for said commodity identifying information, receiving means for receiving said commodity key and reading said commodity identification information and said parity checking information in response to the movement of said clocking indicia during the seating of said key in said receiving means, first storage means for storing said commodity identification information and connected for recirculating said information therethrough without loss thereof, second storage means for storing said parity information, program control means for generating data reading strobe signals, parity checking strobe signals and data shifting clock signals, data reading means responsive to said data reading strobe signals for progressively reading out the commodity identification stored in said first storage means, means for transmitting said data shifting clock signals from said program control means to said first storage means and causing aforesaid recirculating shifting of said commodity identification information, parity checking means responsive to said parity checking strobe signals for progressively reading out said parity checking information from said second storage means in synchronism with the reading out of said commodity identification information and progressively performing a parity check thereagainst, a first printer for printing a first label with a machine readable commodity identification code in response to the reading out as aforesaid of said commodity identification information, means for inhibiting the operation of said first printer if said parity checking means detects a parity error, means for resetting said program control means to cause continuation of aforesaid reading, parity checking and printing operations so long as no parity error occurs and said printer is in condition for operation, means for weighing and computing the value of a commodity of the type represented by said commodity key and conditioned for such weighing and computing by the reset notch in said commodity key, and a second printer for printing a second label with weight and value information in human readable form in response to output signals from said weighing and computing means and including means to force said label against said type face to print a human readable commodity identification thereon.

* * * * *

UNITED STATES PATENT AND TRADEMARK OFFICE
CERTIFICATE OF CORRECTION

PATENT NO. : 3,961,747
DATED : June 8, 1976
INVENTOR(S) : James R. Small and Robert C. Meckstroth It is certified that error appears in the above-identified patent and that said Letters Patent are hereby corrected as shown below:

Column 1, Line 34, "ready" should be --read--.

Column 6, Line 26, delete "2".

Column 9, Line 53, "ood" should be --odd--.

Column 12, Line 60, "partly" should be --parity--.

Column 14, Line 17, after "second" insert --storage means corresponding--.

Signed and Sealed this

Seventh Day of September 1976

[SEAL]

Attest:

RUTH C. MASON
Attesting Officer

C. MARSHALL DANN
Commissioner of Patents and Trademarks